US012359032B2

(12) United States Patent
Long et al.

(10) Patent No.: US 12,359,032 B2
(45) Date of Patent: Jul. 15, 2025

(54) RAPID FABRICATION AND/OR REPAIR OF FIBER REINFORCED COVALENT ADAPTABLE NETWORK COMPOSITES

(71) Applicant: The Regents of the University of Colorado, a body corporate, Denver, CO (US)

(72) Inventors: Rong Long, Louisville, CO (US); Wei Zhang, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 506 days.

(21) Appl. No.: 17/634,922

(22) PCT Filed: Aug. 14, 2020

(86) PCT No.: PCT/US2020/046486
§ 371 (c)(1),
(2) Date: Feb. 11, 2022

(87) PCT Pub. No.: WO2021/030739
PCT Pub. Date: Feb. 18, 2021

(65) Prior Publication Data
US 2022/0315719 A1    Oct. 6, 2022

Related U.S. Application Data

(60) Provisional application No. 62/886,753, filed on Aug. 14, 2019.

(51) Int. Cl.
*B29C 70/34* (2006.01)
*B29C 71/02* (2006.01)
(Continued)

(52) U.S. Cl.
CPC .............. *C08J 5/243* (2021.05); *B29C 70/34* (2013.01); *C08J 7/08* (2013.01); *B29K 2079/00* (2013.01);
(Continued)

(58) Field of Classification Search
CPC ............ B29K 2307/04; B29K 2105/12; B29K 2079/00; C08J 2379/02; B29C 70/34; B29C 70/12; B29C 70/003
See application file for complete search history.

(56) References Cited

U.S. PATENT DOCUMENTS

2015/0259458 A1 * 9/2015 Zhang ..................... C08L 61/22
                                                                 528/266
2017/0044361 A1 * 2/2017 Duquenne ............... C08L 63/00
(Continued)

FOREIGN PATENT DOCUMENTS

CN    101781444 A  *  7/2010
CN    111072920 A     4/2020

OTHER PUBLICATIONS

Mechanical translation of Cheng et al CN-101781444-A dated Jul. 2010. (Year: 2010).*

(Continued)

*Primary Examiner* — Timothy Kennedy
(74) *Attorney, Agent, or Firm* — Holzer Patel Drennan

(57) ABSTRACT

A method for rapidly fabricating or repairing a fiber reinforced composite may include the use of a covalent adaptable network polymer (CAN) powder for encapsulating reinforcing fibers or welding to a CAN matrix. The fiber reinforced composite may be formed or repaired by applying CAN powder to reinforcing fibers or to a damaged area of a fiber reinforcing composite and compressing the CAN powder with the reinforcing fibers or the damaged area of the fiber reinforced composite at a relatively low tempera- (Continued)

ture, temperature and processing time to form a CAN matrix. The method may be configured for fabricating a fiber reinforced composite having specific desired material properties by varying the arrangement and materials used.

17 Claims, 8 Drawing Sheets

(51) Int. Cl.
| | | |
|---|---|---|
| *C08J 5/24* | (2006.01) | |
| *B29K 79/00* | (2006.01) | |
| *B29K 105/08* | (2006.01) | |
| *B29K 105/12* | (2006.01) | |
| *B29K 307/04* | (2006.01) | |

(52) U.S. Cl.
CPC .. *B29K 2105/0854* (2013.01); *B29K 2105/12* (2013.01); *B29K 2307/04* (2013.01); *C08J 2379/02* (2013.01)

(56) References Cited

U.S. PATENT DOCUMENTS

2019/0322835 A1* 10/2019 Qi ............................ C08J 5/121
2020/0147840 A1* 5/2020 Lan ....................... C08G 63/127

OTHER PUBLICATIONS

Yu et al, Reprocessing and recycling of thermosetting polymers based on bond exchange reactions, 2014, RSC Adv., pp. 10108-10117. (Year: 2014).*

Painometry: Wearable and Objective Quantification System for Acute Postoperative Pain, Jun. 2020.

Chabert et al. "Multiple welding of long fiber epoxy vitrimer composites" Soft Matter, vol. 12, Apr. 18, 2016, pp. 4838-4845.

Denissen et al. "Vinylogous Urea Vitrimers and Their Application in Fiber Reinforced Composites", Macromolecules, Macromolecules, vol. 51 Issue 5, Feb. 28, 2018, pp. 2054-2064.

Liu et al. "Biobased epoxy vitrimer from epoxidized soybean oil for reprocessable and recyclable carbon fiber reinforced composite", Composites Communications, vol. 22 Article 100445, Aug. 26, 2020, pp. 1-6.

Taynton et al. "Repairable Woven Carbon Fiber Composites with Full Recyclability Enabled by Malleable Polyimine Networks", Advanced Materials, vol. 28 Issue 15, Apr. 20, 2016, pp. 2904-2909.

Yu et al. "Rapid Fabrication of Malleable Fiber Reinforced Composites with Vitrimer Powder", Applied Polymer Materials, vol. 1 Issue 9, Aug. 27, 2019, pp. 2535-2542.

* cited by examiner

RAPID FABRICATION AND/OR REPAIR OF FIBER REINFORCED COVALENT ADAPTABLE NETWORK COMPOSITES

CROSS-REFERENCE TO RELATED APPLICATIONS

This patent application is a nationalization of and claims priority to PCT Application No. PCT/US2020/046486 filed on Aug. 14, 2020 and entitled RAPID FABRICATION AND/OR REPAIR OF FIBER REINFORCED COVALENT ADAPTABLE NETWORK COMPOSITES, which claims priority to and the benefit of U.S. Provisional Patent Application Ser. No. 62/886,753, filed Aug. 14, 2019 and entitled RAPID FABRICATION OF MALLEABLE FIBER REINFORCED COMPOSITES Each of the aforementioned applications is incorporated by reference herein in their entirety.

BACKGROUND

Thermoset fiber reinforced polymer composites generally consist of long, continuous fibers arranged in parallel or in interwoven mats, which are embedded in a resin or polymer matrix. Existing thermoset fiber reinforced composites are recognized for advantageous material properties, such as high stiffness and strength, outstanding thermal stability, reliable resistance to corrosion, low density, and long fatigue life, as well as for the high tunability of their mechanical properties through the alteration of the fiber orientation, resin composition, or layer configuration of the material. These unique properties have led to the use of thermoset fiber reinforced composites in almost every type of advanced engineering, ranging from spacecraft and windmill turbines to sports equipment and biomedical devices.

Unfortunately, widespread adoption and application of thermoset fiber reinforced composites is currently limited, particularly in industrial sectors involving high volume production, due both to the time-consuming and expensive nature of existing thermoset fiber reinforced composite fabrication processes and the severe environmental and economic issues related to their repair, disposal and recycling.

Existing thermoset fiber reinforced composite fabrication processes are based on liquid-state processing and require long processing times to enable a liquid polymer precursor to impregnate the fibers and cure to form a solid. The viscous flow and curing process can take many hours or even days, depending on the size of the desired composite part, and requires careful control and monitoring until the polymer is cured and stabilized. Similarly, preparation of thermoset fiber reinforced composites is limited by the availability of the precursor chemicals which are relatively unstable and have a short shelf-life, increasing the expense of their preparation, transport, and storage while limiting the possibility of on-demand and large-scale fabrication.

Traditionally, damaged thermoset fiber reinforced composites must be replaced due to the permanent nature of the polymer matrix. Conventional thermoset fiber reinforced composites are also not recyclable. As such, local damage to a part made with thermoset fiber reinforced composites may require the costly replacement of the entire part, for example in the transportation and wind energy areas, and may further result in the part being discarded. Even where repair of thermoset fiber reinforced composite components has been achieved, the repair requires the use of high temperatures and large molds, essentially re-fabricating the entire component, such that repairing the component can result in the loss of valuable operation time and require costly transportation of the component to appropriate repair facilities. The lack of a rapid and in-situ method for repairing thermoset fiber reinforced composites, especially under low pressure and low temperature conditions, remains a significant challenge in the continued development and adoption of thermoset fiber reinforced composites in relevant industries.

Ways to improve the fabrication and repair of thermoset fiber reinforced composites have been the focus of extensive research into alternative materials and processing methods. Currently, thermoplastic fiber reinforced composites with short chopped fibers are widely recognized as providing an alternative material having significantly shorter processing times, however the mechanical performance of such thermoplastic fiber reinforced composites cannot compare with that of thermoset fiber reinforced composites. Similarly, some progress has been made in modifying the liquid-state fabrication process of thermoset fiber reinforced composites to use a partially cured liquid polymer precursor, or "prepreg" sheet, in place of the liquid polymer precursor for combination with the fibers, but the partially cured polymer precursor requires maintaining low temperatures and shares the sensitivity and instability of the liquid polymer precursor, being likewise difficult to prepare, transport and store.

There remains a need for a rapid and cost-effective method for the fabrication of thermoset fiber reinforced composites that maintains their advantageous material properties. Similarly, reparable thermoset fiber reinforced composites are highly desired, particularly where a rapid repair may be made to a component in-situ without increasing the cost or complexity of the repair relative to replacing the component. Ideally any improvements to thermoset fiber reinforced composites would also be capable of near total recycling, including recycling and reuse of both the polymer matrix and the reinforcing fibers.

SUMMARY

Embodiments of the present disclosure are directed to methods for rapid fabrication and repair of a thermoset fiber reinforced polymer composite, related methods of use, and resulting composite products.

According to embodiments of the disclosure, a fiber reinforced composite is provided having a covalent adaptable network polymer (CAN) matrix encapsulating reinforcing fibers. The reinforced fiber composite exhibits advantageous properties of both thermoset reinforced fiber composites and thermoplastic fiber reinforced composites while being reparable and recyclable. An advantage of a fiber reinforced CAN composite is the ability to reversibly rearrange covalent bonds, such that the fiber reinforced CAN composite shares many of the desirable properties of a thermoset fiber reinforced composite but can also be triggered to flow and relax stress, enabling advantages similar to those of a thermoplastic fiber reinforced composite.

In at least one embodiment, a method of fabricating a fiber reinforced composite is provided. The method includes providing a CAN powder and reinforcing fibers, compressing the CAN powder and the reinforcing fibers at an elevated temperature and an elevated pressure to form a fiber reinforced composite material having a CAN matrix continuous phase and a reinforcing fiber dispersed phase. Vitrimer powder may be preferred as the CAN powder, particularly polyimine powder, due to their high mechanical properties and advantageous triggering temperatures, however various CAN powders may be used depending on the desired characteristics of a fiber reinforced composite.

The use of a CAN powder for fabricating fiber reinforced composites allows for the development of high volume and on-demand manufacturing. More specifically, the use of a powder in the form of solid particles means that the precursor materials, including the CAN powder and the reinforcing fibers, are stable and simple to use, transport and store. In contrast, liquid-state manufacturing methods involve a polymerization reaction and/or active curing steps during combination with reinforcing fibers, such that the reaction must be actively monitored, temperature controlled, and otherwise stabilized. The drawbacks to known methods for fabricating fiber reinforced composites have prevented widespread use and adoption of fiber reinforced composites, particularly where large-scale and on-demand manufacturing is required.

The compressing of the CAN powder and the reinforcing fibers may be performed in a heat press, compression mold or using a similar device at a fusing temperature within the range of 65° C. to 400° C., more particularly within the range of 150° C. to 300° C., or more particularly within the range of 200° C. to 250° C., and under a pressure within the range of 0.5 MPa to 1.25 MPa, or more particularly within the range of 0.65 MPa to 1.00 MPa.

Rather than polymerizing or curing a polymer during application to reinforcing fibers, the use of the CAN powder according to the current disclosure allows for rapid formation of a CAN matrix encapsulating reinforcing fibers by leveraging the unique covalent bonds of CANs and their interaction with reinforcing fiber materials. The compression of the CAN powder and the reinforcing fibers may be completed on the order of minutes, which is significantly shorter than the hours or days required for typical liquid-state manufacturing methods. The processing time may be equal to or less than 65 minutes, equal to or less than 30 minutes, equal to or less than 25 minutes, more particularly equal to or less than 5 minutes. Particular combinations of temperature, pressure and processing time may be selected for different CANs, or for achieving specific mechanical properties.

Embodiments of the present disclosure may further reduce the required temperature, pressure and/or processing time for forming the fiber reinforced composites by wetting the powder prior to the compression and fusion step. Surprisingly, wetting the powder acts as an activating agent and assists in triggering reversible addition or bond exchange reactions. According to varying embodiments, water and/or pure amine compounds may be used for wetting the powder.

Notably, the use of a CAN powder in the fabrication methods of the disclosure does not require the use of catalysts in the step of combining the CAN and the reinforcing fiber. While any known catalysts may be employed in the disclosed methods, the advantages described herein are achievable without the use of a catalyst.

In an embodiment, single-ply fiber reinforced CAN composites may be formed by providing a first layer of CAN powder, a reinforcing fiber sheet, and a second layer of CAN powder for compression at an elevated temperature and pressure. The resulting single-ply fiber reinforced composite includes a CAN matrix continuous phase and a reinforcing fiber dispersed phase. Single-ply fiber reinforced CAN composites from embodiments of the disclosure may be welded together to form multi-ply composites by providing a plurality of single-ply fiber reinforced composites for compressing at an elevated temperature and pressure.

Fiber reinforced composites of the various embodiments may be configured to have specific mechanical properties by variations in the number of plies, the CAN material used, the reinforcing fibers used, the arrangement of the reinforcing fibers in the CAN matrix, and the volume fractions of the reinforcing fibers and the CAN matrix in the composite.

Known methods for repairing fiber reinforced composites are notoriously difficult and require specialized equipment, such that minor or local damage cannot be repaired without essentially reforming the entire matrix of the composite using high temperatures and large molds.

Surprisingly, fiber reinforced composites fabricated using the methods of the current disclosure have been found to be both easily reparable and recyclable. Rather than requiring the use of a conventional heat press, compression mold, high temperatures, or long processing times as in known methods for repairing fiber reinforced composites, the use of a powder has unexpectedly been found to allow for localized repair of a fiber reinforced composite, at dramatically lower temperatures and pressures than have been achieved previously.

In an embodiment, a CAN powder may be applied directly to a damaged surface of a fiber reinforced composite, such as to a scratch, crack, break or hole in the surface. Local application of a relatively low heat and pressure for a short time allows for rapid, in-situ, and adaptable repairs to the CAN matrix of the composite and/or to cracks in the reinforcing fibers. As the powder may be locally applied to relatively small areas, and due to the low pressure and temperatures required, even fiber reinforced composites having curved surfaces may be repaired using the methods of the disclosure. The low heat required for the repair may be within a range of 65° C. to 125° C., while a pressure of less than 1 MPa or less than 0.5 MPa is applied to the damaged surface of the composite, allowing for the application of heat and pressure by hand, for example using an iron, a heated plate, a heated roller or another similar device. A processing time for the repair using the CAN powder may be less than 10 minutes, equal to or less than 6 minutes, or more particularly equal to or less than 3 minutes.

Embodiments of the present disclosure may further reduce the required temperature, pressure and/or processing time for repairing the damaged fiber reinforced composites by wetting the powder prior to the application of low heat and pressure. As described above, wetting the powder acts as an activating agent and assists in triggering reversible addition or bond exchange reactions. Further, wetting the powder enables the powder to stick to and fill a damaged area of the fiber reinforced composite.

According to varying embodiments, the CAN matrix in the resulting fiber reinforced composite may be malleable and thermoformable, such that reprocessing of the composite is enabled. Accordingly, fiber reinforced CAN composites in embodiments may be shaped by cutting, bending or other manipulation such that the composite takes on an appropriate shape for an intended use, the shape of the composite being secured using clips, frames, or other temporary reinforcement. The resulting shaped composite may then be heated at a thermoforming temperature within the range of 150° C. to 250° C., or under 200° C., for a period of at least 2 hours, at least 3 hours, or between 2 hours and 4 hours. Following the heating of the shaped composite, the shape may be retained without the clips, frames, or other temporary reinforcement used in the shaping step. The thermoforming process is repeatable, such that the fiber reinforced composites may be shaped multiple times for different uses.

The above embodiments solve the problem of existing fiber reinforced composites by providing a CAN material in a powder form for fusing to reinforcing fibers at an elevated heat and pressure for a short period of time. Features and steps from any of the disclosed embodiments may be used in combination with one another, without limitation. For example, any of the compositional limitations described with respect to one embodiment may be present in any of the other described embodiments. In addition, other features and advantages of the present disclosure will become apparent to those of ordinary skill in the art through consideration of the following detailed description and the accompanying drawings.

Figure 1:
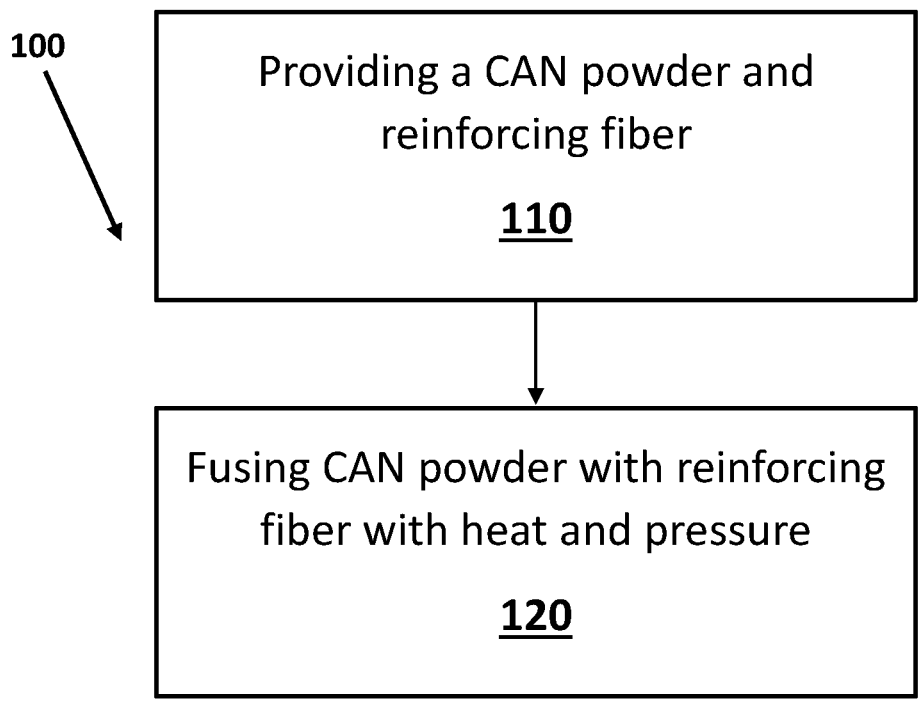
FIG. 1 shows a flow chart of a method of forming a fiber reinforced composite according to an embodiment of the disclosure.

The drawings and figures are not necessarily drawn to scale, unless otherwise indicated, but instead are drawn to provide a better understanding of the components, and are not intended to be limiting in scope, but to provide exemplary illustrations.

DETAILED DESCRIPTION OF VARIOUS EMBODIMENTS

To further clarify the above and other advantages and features of the present disclosure, a more particular description will be rendered by reference to specific embodiments thereof, which are illustrated in the appended drawings. It is appreciated that these drawings depict only typical embodiments of the disclosure and are therefore not to be considered limiting of its scope. The present disclosure will be described and explained with additional specificity and detail through the use of the accompanying drawings, in which like reference characters refer to like elements.

It is to be understood that the disclosure is not limited to the specific embodiments and methods described below, as specific components and/or conditions may, of course, vary. Furthermore, the terminology used herein is used only for the purpose of describing particular embodiments and is not intended to be limiting in any way.

Except in the examples, or where otherwise expressly indicated, all numerical quantities in this description indicating amounts of material or conditions of reaction and/or use are to be understood as modified by the word "about" in describing the broadest scope of the disclosure. Also, unless expressly stated to the contrary: description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation; and, unless expressly stated to the contrary, measurement of a property is determined by the same technique as previously or later referenced for the same property.

It must also be noted that, as used in the specification and the appended claims, the singular form "a," "an," and "the" may comprise plural references unless the context clearly indicates otherwise. For example, reference to a component in the singular is intended to comprise a plurality of components.

As discussed above, a need exists for an improved fabrication method for thermoset fiber reinforced polymers. Embodiments of the present disclosure provide methods for rapid fabrication and repair of a thermoset fiber reinforced composite that offers a proven reduction in processing time while increasing simplicity and stability of processing relative to conventional methods. The disclosed method for fabricating and repairing a thermoset fiber reinforced composite may result in improved material properties for thermoset fiber reinforced composites, and embodiments of the disclosure include resulting composite products and related methods of use.

Referring now to FIG. 1, a method 100 of forming a fiber reinforced composite according to an embodiment of the disclosure is shown schematically in a flow chart. The method 100 may include providing a covalent adaptable network polymer (CAN) powder and reinforcing fibers at step 110. In step 120 of the method, an elevated temperature and an elevated pressure may be applied to the CAN powder and the reinforcing fibers for fusing into a fiber reinforced composite having a CAN matrix continuous phase and a reinforcing fiber dispersed phase.

Figure 2:
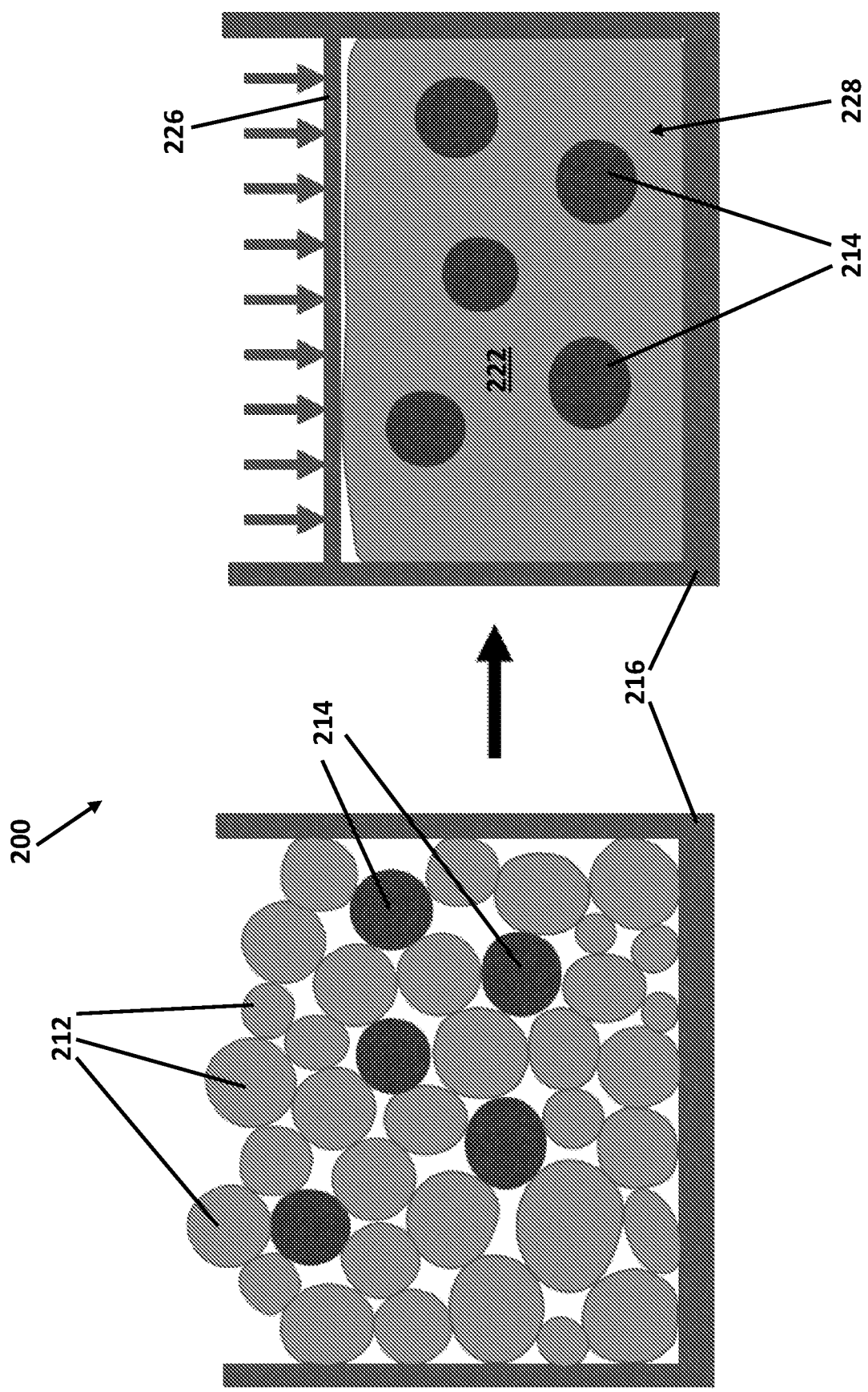
FIG. 2 shows a schematic flow diagram of a method of forming a fiber reinforced composite according to the embodiment of FIG. 1.

In the illustrated method 200 of FIG. 2, CAN powder 212 and reinforcing fibers 214 may be placed in a mold 216 at a predetermined ratio. The CAN powder 212 may comprise solid particles of a CAN polymer, the CAN polymer having the ability to reversibly rearrange covalent bonds such as by reversible addition or bond exchange reactions. In varying embodiments, the CAN powder 212 may comprise a vitrimer, such as an epoxy vitrimer or a polyimine vitrimer, and may be selected based on the desired material properties of a fiber reinforced composite 228. A polyimine vitrimer may be preferred in some embodiments due to its low trigger temperature for bond exchange reactions, responsiveness to water, and the higher mechanical properties of polyimine composites relative to some vitrimer composites, particularly relative to epoxy vitrimer composites.

Particle size, shape and distribution may also vary depending on the desired material properties of the fiber reinforced composite. For example, the CAN powder 212 may comprise solid particles with an equivalent diameter of spherical particles having a median within a range of 1 μm to 200 μm or within a range of 10 μm to 100 μm. The solid particles may be formed as grains or shavings, and may have a generally elliptical shape, a generally planar shape, or an irregular shape. A selected size and/or shape of the solid particles may be advantageous in methods of the current disclosure, as the interaction between the reinforcing fibers 214 and the CAN may be significant, which increases the complexity of the solid particle size's effects relative to a fusion of only CAN particles.

In some embodiments, the CAN powder 212 may be wetted prior to the fusing step 120. The powder 212 may be wetted after placement in the mold 216 or before placement in the mold 216. Surprisingly, wetting the CAN powder 212 prior to fusing results in a reduction in the temperature, pressure and/or processing time needed for fusing the CAN powder and the reinforcing fibers into a fiber reinforced composite having a CAN matrix continuous phase and a reinforcing fiber dispersed phase. Water and/or pure amine compounds are preferred for wetting the powder, either alone or in combination, and have been discovered to assist in triggering reversible addition or bond exchange reactions in embodiments of the current disclosure.

The reinforcing fibers 214 may comprise carbon fiber, glass fiber and/or synthetic fibers such as aramid fiber. According to various embodiments, the reinforcing fibers 214 may be arranged in the CAN powder 212 depending on the desired material properties of a fiber reinforced composite 228. In one example, the reinforcing fibers 214 may be provided as a fabric or mat, either woven or non-woven. In another example, the reinforcing fibers 214 may be organized in an inter-layer configuration or an intra-layer configuration or may be randomly dispersed in the CAN powder 212. While specific examples of reinforcing fibers are described herein, any reinforcing fiber materials, configurations or sizes may be employed in the described methods as would be understood by one skilled in the art and informed by the present disclosure.

The mechanical properties of the fiber reinforced composite 228 may be advantageously controlled by the volume fractions of the reinforcing fibers 214 and the CAN matrix 222 in the composite. The use of a CAN powder 212 and a reinforcing fiber 214 simplifies the control of the volume fractions of the reinforcing fibers 214 and the CAN matrix 222 in the composite, as the weight ratio of CAN powder 212 to reinforcing fibers 214 can be easily varied by adding or removing CAN powder 212 prior to the fusing step 120. As would be understood by one of ordinary skill in the art, control of the volume fraction of reinforcing fibers 212 and CAN matrix 222 in a composite using conventional methods, such as liquid-state methods, requires more complex calculations due to the nature of the chemical synthesis and cannot be easily changed once the liquid polymer precursors having been mixed. In varying examples of the disclosure, the fiber reinforced composites 228 may have a fiber weight ratio in the range of 15% to 85% or in the range of 25% to 75%.

In the fusing step 120, the CAN powder 212 is heated and compressed about the reinforcing fibers 214 for a predetermined processing time, the CAN powder 212 forming a CAN matrix continuous phase 222 surrounding and impregnating the reinforcing fibers 214. According to an embodiment, the mold 216 may be heated while a plate, a lid or similar element 226 compresses the CAN powder 212 in the mold 216 and/or the plate 226 may be heated while compressing the CAN powder 212. According to variations of the fusion step 120, the CAN powder 212 and the reinforcing fibers 216 may be heated and compressed using a heated press, a compression mold or using similar devices as would be recognized by one of ordinary skill in the art informed by the present disclosure.

The selection of an appropriate pressure, temperature and processing time in the fusing step 120 are critical for realizing the advantages of some embodiments, as defects in the fused CAN matrix 222 and/or poor interaction between the CAN matrix 222 and the reinforcing fibers 216 can result in a weakened or otherwise defective composite 228. Higher temperatures or longer processing times can result in faster or more bulk stress relaxation and interface healing, such that heating temperature and processing time together determine the extent of CAN powder 212 fusion. Increasing pressures may improve mechanical properties of the resulting composite 228, but excessively high pressure may damage the composite samples.

For example, if too low of pressure is used, the particles of the CAN powder 212 may not fully conform to one another, leaving voids in the fused CAN matrix 222. In contrast, the use of a pressure that is too high may cause cracks in the CAN matrix 222. Where the temperature is too low or the processing time is too short, insufficient bulk stress relaxation within the particles of the CAN powder 212 and insufficient interface healing between the particles may occur. A temperature that is too high or a processing time that is too long may instead result in mass loss or thermal degradation of the CAN material.

In embodiments, the CAN powder 212 and the reinforcing fibers 214 may be processed at a temperature within the range of 65° C. to 400° C., more particularly within the range of 150° C. to 300° C., or more particularly within the range of 200° C. to 250° C., and under a pressure within the range of 0.5 MPa to 1.25 MPa, or more particularly within the range of 0.65 MPa to 1.00 MPa. The processing time may be equal to or less than 65 minutes, equal to or less than 30 minutes, equal to or less than 25 minutes, more particularly equal to or less than 5 minutes. Particular combinations of temperature, pressure and processing time may be selected for different CANs, as illustrated in the examples provided in the disclosure.

The advantageous processing conditions, and especially the low processing times, of the disclosed methods are reliant on the use of a CAN powder according to the particular methods of the current disclosure. Prior art efforts for enhancing the processing speed of a fiber reinforced composite include the use of partially cured or "pre-preg" polymer sheets, or the use of catalyst materials. These known methods provide limited benefits relative to conventional liquid-state impregnation, requiring costly process controls, processing times on the order of days, and providing a very limited shelf-life for precursor materials.

Figure 3:
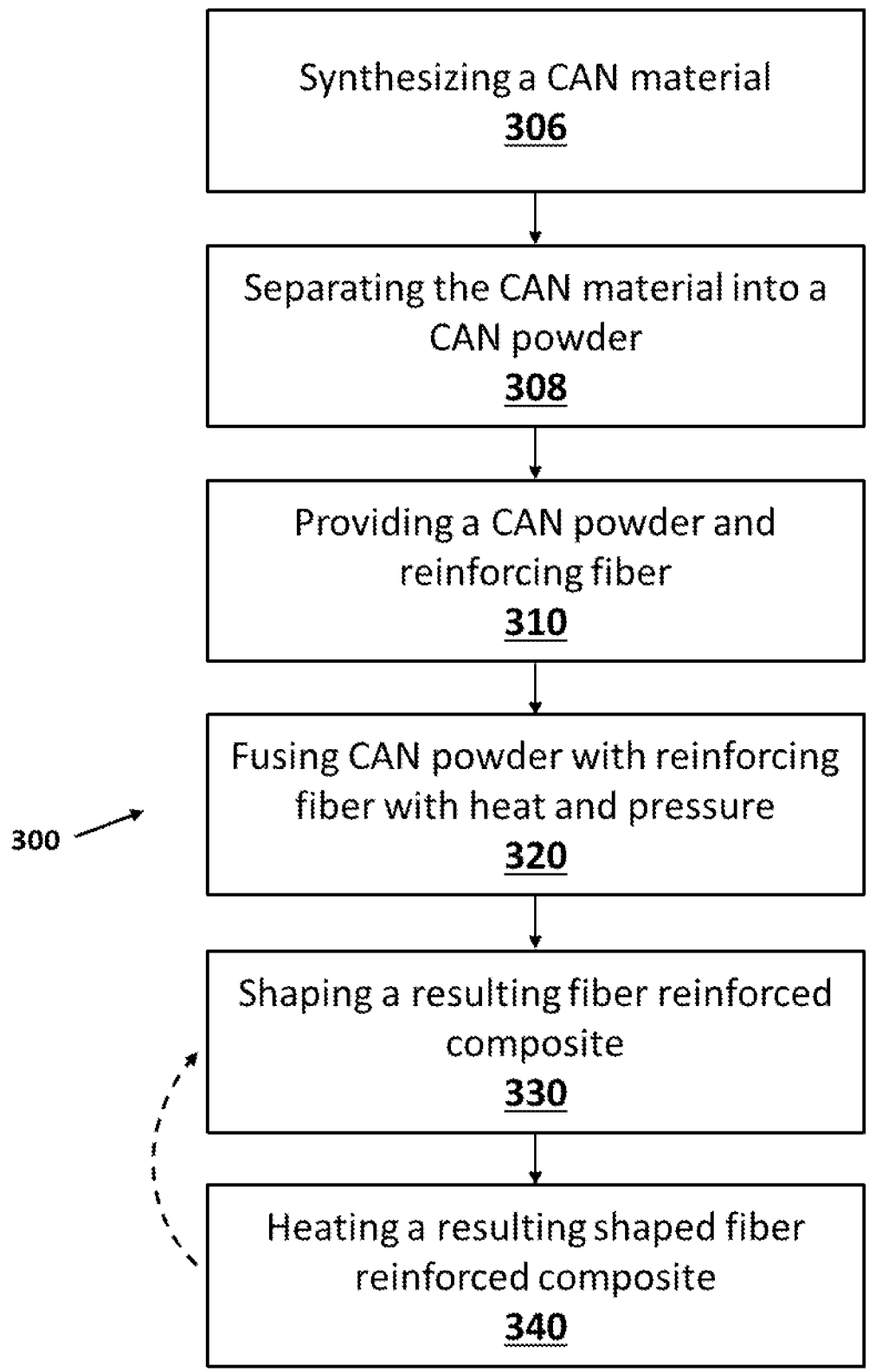
FIG. 3 shows a flow chart of a method of forming a fiber reinforced composite according to an embodiment of the disclosure.

According to the method 300 of FIG. 3, the provided CAN powder 212 may be prepared by synthesizing 306 a bulk CAN material from a mixture of liquid precursors, or another conventional method, and grinding or cutting or otherwise separating 308 the bulk CAN material into a CAN powder 212, for example using a sand belt grinder, a chipper or a shredder. In an alternative, the CAN powder 212 may be prepared by synthesizing individual CAN particles separately at a desired size and/or shape. The use of a CAN powder 212 according to the present disclosure advantageously allows that the CAN may be fabricated in advance without the storage, transport and stability concerns of liquid-state impregnation or partially cured "pre-preg" methods, such that the CAN powder 212 may be produced at large volumes and stockpiled or transported for future use without requiring refrigeration, monitoring, etc.

As discussed previously, liquid-state impregnation or partially cured "pre-preg" methods require curing or polymerizing the liquid or semi-liquid precursor while in contact with a desired reinforcing fiber. The curing or polymerizing reaction must be carefully controlled and monitored as the liquid or semi-liquid precursors are "not shelf-stable" and require that the reaction be completed once started.

In addition to the short processing time for the fusion step 320 following the step 310 of providing the CAN powder and reinforcing fibers, the malleability of the CAN matrix in the resulting fiber reinforced composite may enable reprocessing of the composite, for example through thermoforming. According to an embodiment, the method 300 may include a step 330 of shaping the fiber reinforced composite and a step 340 of heating the resulting shaped composite. The fiber reinforced composite may be shaped by cutting, bending or other manipulation such that the composite takes on an appropriate shape for an intended use, the shape of the composite being secured using clips, frames, or other temporary reinforcement. The resulting shaped composite may then be heated at a thermoforming temperature within the range of 150° C. to 250° C., or under 200° C., for a period of at least 2 hours, at least 3 hours, or between 2 hours and 4 hours. Following the heating of the shaped composite the shape may be retained without the clips, frames, or other temporary reinforcement used in the shaping step 330. The shaping step 330 and heating step 340 may be repeated, such that the composite may be reshaped for alternative uses or as part of a repair process.

Figure 4:
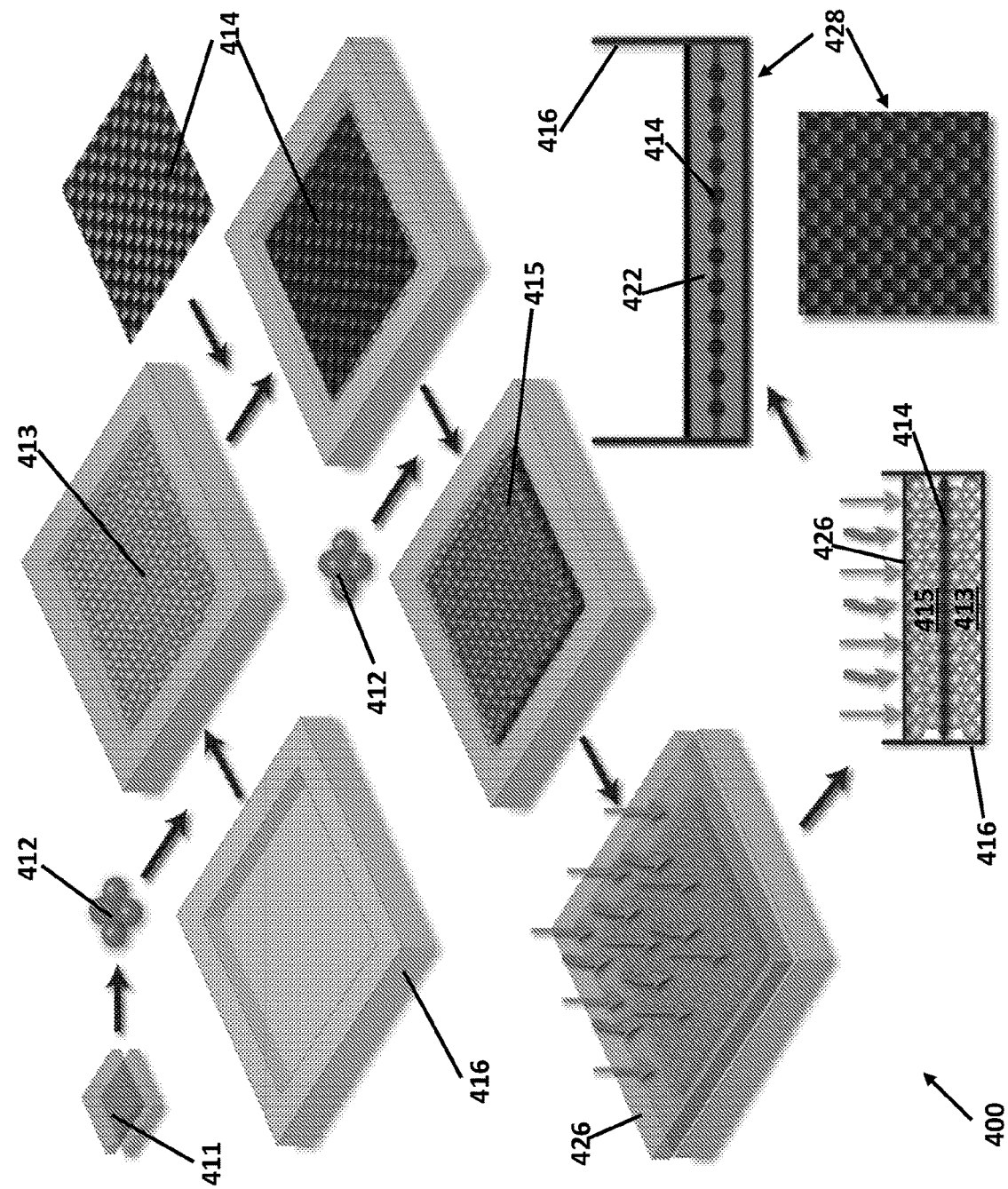
FIG. 4 shows a schematic flow diagram of a method of forming a fiber reinforced composite according to an embodiment of the disclosure.

In the illustrated embodiment of FIG. 4, a method 400 is shown for forming a single-ply reinforced composite sheet 428. As discussed in the method 300 of FIG. 3, a CAN polymer 411 may be provided as a bulk material, such as in the form of a sheet, and may be separated into particles for forming a CAN powder 412. A first layer 413 of CAN powder 412 may be added to a mold 416 and a sheet or layer of reinforcing fibers 414 may be placed over the first layer 413 in the mold 416. A second layer 415 of CAN powder 412 may be placed over the layer of reinforcing fibers 414.

For fusing the CAN powder 412, a plate 426 and the mold 416 may be used to heat and compress the first layer 413 and the second layer 415 of CAN powder 412 about the reinforcing fibers 414 for a predetermined processing time. Under heat and pressure the CAN powder 412 from both the first layer 413 and the second layer 415 fuse together and form a CAN matrix continuous phase 422 surrounding and impregnating the reinforcing fibers 414. The resulting single-ply reinforced composite sheets 428 formed from the powder-based methods of the current disclosure have been discovered to be both weldable and malleable under heat and/or water stimulus, likely due to the dynamic nature of the CAN matrix 422 in the composite sheets 428.

According to an embodiment, owing to the interface weldability of the CAN matrix 422, multi-ply composites can be rapidly made through welding of multiple single-ply composite sheets 422. While processing conditions equal to those used for fusing the CAN powder 412 into the CAN matrix 422 surrounding and impregnating the reinforcing fibers 414 may be used, where two single-ply composite sheets 422 are joined a lower temperature and/or processing time may be required due to a reduced interface area between fusing CAN particles and due to the reinforcing fibers 414 already being encapsulated in the CAN matrix 422. For example, two single-ply composite sheets 422 may be joined at a temperature within the range of 65° C. to 300° C., more particularly within the range of 65° C. to 250° C., or less than 200° C., and under a pressure within the range of 0.5 MPa to 1.25 MPa, or more particularly within the range of 0.65 MPa to 1.00 MPa. The processing time may be equal to or less than 65 minutes, equal to or less than 30 minutes, equal to or less than 25 minutes, equal to or less than 5 minutes, more particularly equal to or less than 3 minutes.

The welding of multiple single-ply composite sheets 422 contributes to the tunability of fiber reinforced composites obtainable from the disclosed methods. A multi-ply composite produced according to varying embodiments of the disclosure may advantageously exhibit a higher bending rigidity than a single-ply composite, and variations in the number of plies, the CAN material used, the reinforcing fibers used, the arrangement of the reinforcing fibers in the CAN matrix, and the volume fractions of the reinforcing fibers and the CAN matrix in the composite can further tailor the material properties of the composite to the requirements of a particular use.

The fabrication of a multi-ply composite may also be realized by repeating steps 310 and 320 of the method 300, such that a further single-ply composite layer is formed directly on the single-ply reinforced composite sheet 428. Similarly, varying amounts of CAN powder may be employed in steps 310 and 320 of the method 300, such as using only one layer of CAN powder or more than two layers of CAN powder, or using a plurality of reinforcing fiber layers or dispersing reinforcing fibers in the CAN powder in another configuration as would be understood by one of ordinary skill in the art informed by the present disclosure.

Surprisingly, fiber reinforced composites fabricated using the methods of the current disclosure have been found to be both easily reparable and recyclable. Rather than requiring the use of a conventional heat press, compression mold, high temperatures, or long processing times as in known methods for repairing fiber reinforced composites, the use of a powder has unexpectedly been found to allow for localized repair of a fiber reinforced composite, at dramatically lower temperatures and pressures than have been achieved previously.

Figure 5:
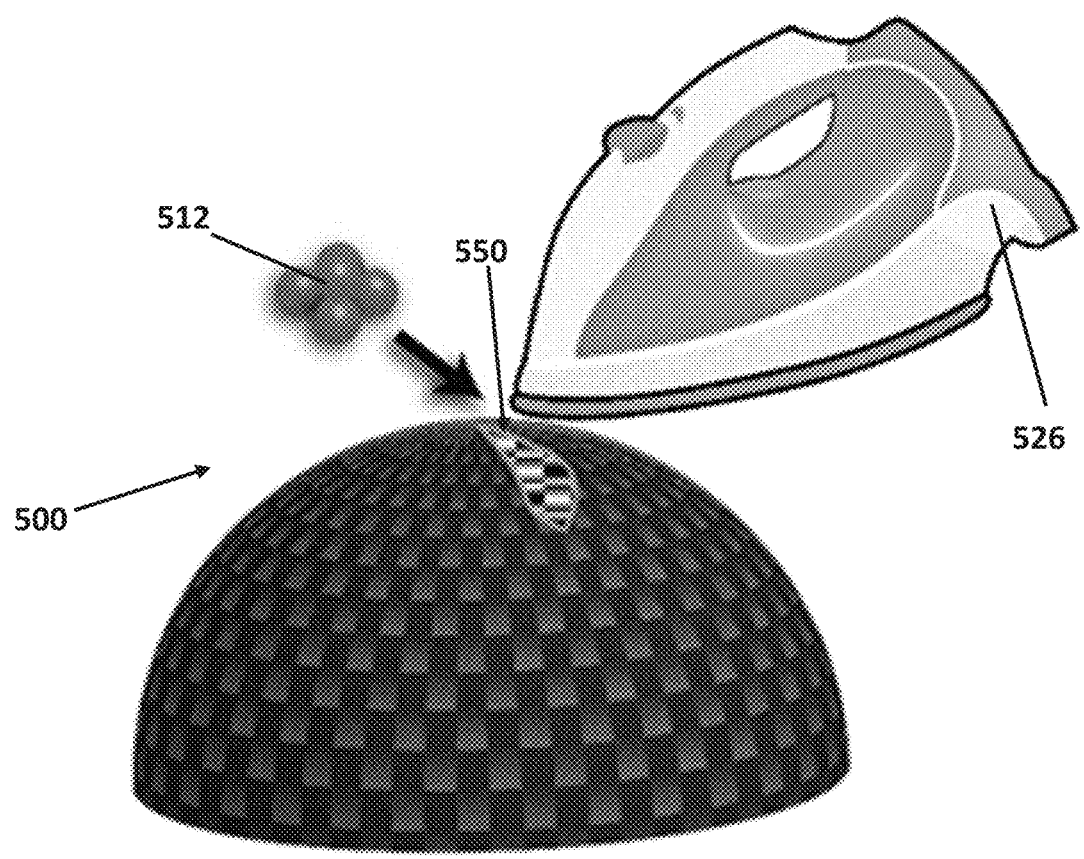
FIG. 5 shows a schematic flow diagram of a method of repairing a fiber reinforced composite according to an embodiment of the disclosure.

As illustrated in the method 500 of FIG. 5, CAN powder 512 may be added to a damaged surface 550 of a fiber reinforced composite 528 and subjected to a low heat and pressure, for example using an iron, heated roller or other heated element 526 held by hand. The low heat required for the repair may be within a range of 65° C. to 125° C. while a pressure of less than 1 MPa or less than 0.5 MPa is applied to the damaged surface of the composite, a processing time for the repair being less than 10 minutes, equal to or less than 6 minutes, or more particularly equal to or less than 3 minutes.

The methods of repairing a damaged surface of a fiber reinforced composite according to embodiments of the current disclosure are applicable to repairing damage to only the CAN matrix of a composite as well as to damage in both the reinforcing fiber and the CAN matrix (e.g., the composite is cracked). The methods are also an effective (rapid and in-situ) method of patching a broken composite, which makes the composite more durable. The ability to repair and/or patch the fiber reinforced composites in-situ and in a rapid, efficient manner (i.e., fast, mold-free, low pressure and low temperature) can effectively extend the service life of the fiber reinforced composites and facilitate widespread use of the composites in industrial sectors where the durability and long service life are critical (e.g. wind energy and air transportation).

The CAN powder-based repair may be especially advantageous where a curved fiber reinforced composite is considered. As fiber reinforced CAN composites fabricated according to the current disclosure are thermally malleable, conventional repair methods requiring high temperatures must be performed almost entirely within a mold to ensure that the repair does not damage, flatten or otherwise misshape the composite. As such, repair of fiber reinforced composites is often disfavored, leading to complete replacement of the composite part and to discarding or recycling the damaged composite.

In contrast to known repair methods, the powder-based repair may be performed locally, with a low temperature, pressure and processing time. Where a damaged composite has a curved surface, heat and pressure may be applied using a roller, a curved plate or iron, or another curved instrument that allows the repair to follow the profile of the curved surface, without extending over a significant surface area of the composite that is not damaged. For example, the heating element may have a surface area that is equal to or less 150% of a damaged surface area of the composite, equal to or less than 120% of the damaged surface area of the composite, equal to or less than 100% of the damaged surface area of the composite, or more particularly equal to or less than 80% of the damaged surface area of the composite.

In one example, a plate or other counter support may be provided on a surface of the fiber reinforced composite opposite the damaged surface. The counter support may be held by hand or otherwise fixed in place using a frame or other means, such that the damaged surface of the fiber reinforced composite being repaired is pressed between the heated element and the counter support for ensuring sufficient pressure is applied without deforming the fiber reinforced composite. In variations, the counter support may be heated in addition to the heated element.

The following examples are provided to illustrate specific embodiments of the current disclosure and to demonstrate the features and advantages of the embodiments but are not intended to limit the scope thereof. Instead, the examples guide one of ordinary skill in the art in understanding and applying the inventive concepts of the disclosure.

Examples 1-3 below are based on a powder-based rapid fabrication method of fiber reinforced composites using an epoxy-based vitrimer. An epoxy-acid vitrimer was prepared through the condensation of a mixture of dimers and trimers of fatty acids (~23 wt. % dimers and 77 wt. % trimers) and Bisphenol A diglycidyl ether at 130° C. under vacuum in a 1:1 stoichiometric ratio of acid and epoxide functional groups for 8 hours until no gas evolution was observed. The mixture was then quickly poured into 10 cm×10 cm×1.5 cm PTFE mold and kept in an oven for 8 hours at 130° C.

Dynamic Mechanical Analysis (DMA) was performed on the samples using a TA Q800 apparatus. A rectangular sample of pure epoxy-acid vitrimer with a cross section of 4.3 mm×2.3 mm and a length of 6.9 mm was tested under tension. Dynamic tensile strain was applied at a frequency of 1 Hz with an amplitude of 0.22%. For temperature control, the sample was first cooled to −20° C. and held for 5 minutes, then the temperature was increased from −20° C. to 80° C. at a rate of 3° C./min. The glass transition temperature $T_g$ of the vitrimer was found to be 33.7° C. The moduli of the prepared CAN polymers were measured from uniaxial tensile tests using a mechanical testing machine (INSTRON 5965, INSTRON, Norwood, MA), and were found to be ~3.8 MPa.

Figure 6:
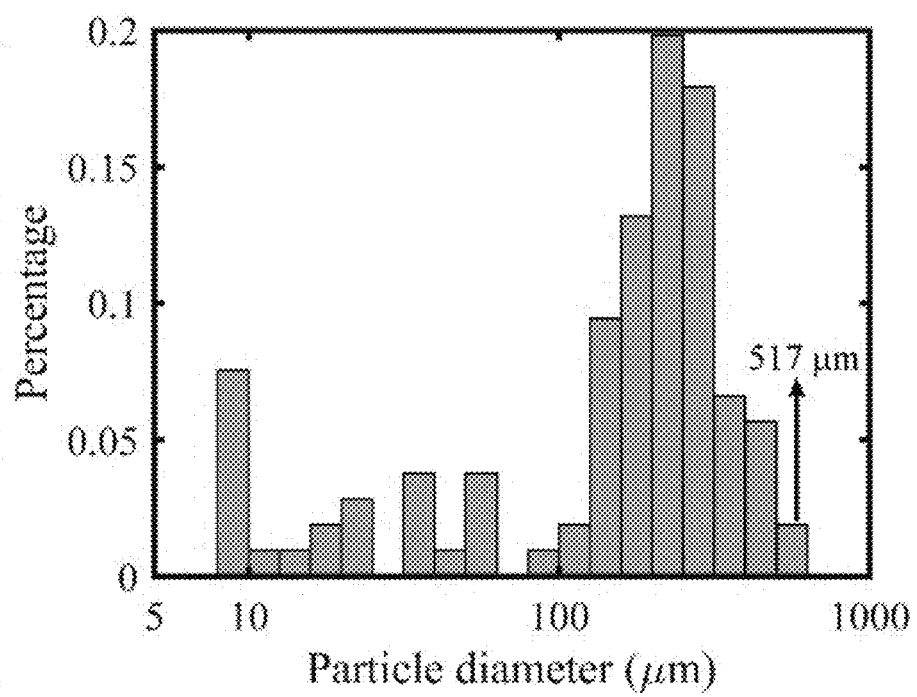
FIG. 6 shows a chart of particle size distribution for a CAN powder according to an embodiment of the disclosure.

The vitrimer obtained from chemical synthesis was ground into powder using a wheel grinder (36&60 grit level, GRIZZLY 6" Bench Grinder, GRIZZLY INDUSTRIAL, Bellingham, WA). The size distribution of the vitrimer particles within the powder were examined using an optical microscope and analyzed using image processing software. An equivalent diameter of spherical particles having the same areas as the vitrimer particles was distributed between 8 μm and 500 μm, with a median particle size over 100 μm, as shown in FIG. 6.

Epoxy-acid vitrimer powder, prepared as described above, was deposited in an aluminum mold that was attached to a heat press machine (CARVER LABORATORY PRESS MODEL C, CARVER INC., Wabash, IN). Teflon sheets were added between the mold surface and the vitrimer powder to assist release after compression molding. An interwoven carbon fiber mat (1K T300, ROCK WEST COMPOSITES, West Jordan, UT) was trimmed to fit into the mold, placed on top of the layer of vitrimer powder, and then covered by another layer of vitrimer powder. The mold was closed, and the compression molding process was initiated under a controlled pressure and temperature.

Example 1

A parametric study was performed testing various combinations of the three parameters: temperature (200° C. and 250° C.), pressure (0.38 MPa, 0.67 MPa and 0.96 MPa) and processing time (5 min, 25 min), and resulting mechanical properties of the vitrimer composite samples (i.e., Young's modulus E and tensile strength $\sigma_t$) from different processing conditions are shown in Table 1.

TABLE 1

Mechanical Properties of Epoxy-Acid Vitrimer Composites

| Processing Conditions/ Mechanical Properties | | 0.38 MPa | 0.67 MPa | 0.96 MPa |
|---|---|---|---|---|
| 200° C. | 5 min | Insufficient | Insufficient | Severely Cracked |
| | 25 min E (GPa) | 4.97 ± 0.92 | 7.49 ± 0.3 | Slightly Cracked |
| | $\sigma_t$ (MPa) | 53.58 ± 9.95 | 83.64 ± 14.42 | |
| 250° C. | 5 min E (GPa) | 4.22 ± 1.03 | 6.2 ± 0.74 | 3.65 ± 1.11 |
| | $\sigma_t$ (MPa) | 64.7 ± 11.5 | 78.75 ± 8.34 | 55.49 ± 23.0 |
| | 25 min E (GPa) | 5.43 ± 1.98 | 4.22 ± 1.13 | 4.96 ± 1.7 |
| | $\sigma_t$ (MPa) | 83.08 ± 10.09 | 62.27 ± 24.79 | 64.56 ± 10.37 |

For each composite sample the volume fraction of carbon fiber was approximately 35%, determined as the ratio between the thickness of carbon fiber sheet (0.17 mm) and the total thickness of composite sample. The modulus and strength of composite samples are much higher than the Young's modulus E (3.8 MPa) and strength $\sigma_t$ (2.8 MPa) of the pure vitrimer.

As listed in Table 1, when relatively low temperature (200° C.) and short processing time (5 minutes) were used, the vitrimer powder was not sufficiently fused, which resulted in opaque composite samples with poor mechanical properties. Using the same temperature (200° C.) and a longer processing time (25 minutes) resulted in composite samples with a fully fused vitrimer matrix. The temperature was raised to 250° C. and the vitrimer powder was completely fused within 5 minutes. The Young's modulus and tensile strength for composite samples fabricated at 250° C. for 5 minutes was comparable to those of the samples produced at a lower temperature (200° C.) but for a longer time (25 minutes). An increase in processing time (5 minutes to 25 minutes) under the relatively higher temperature (250° C.) did not significantly enhance the Young's modulus and tensile strength (see Table 1), indicating that the short processing time (5 minutes) is already sufficient for vitrimer fusion at 250° C.

Figure 7:
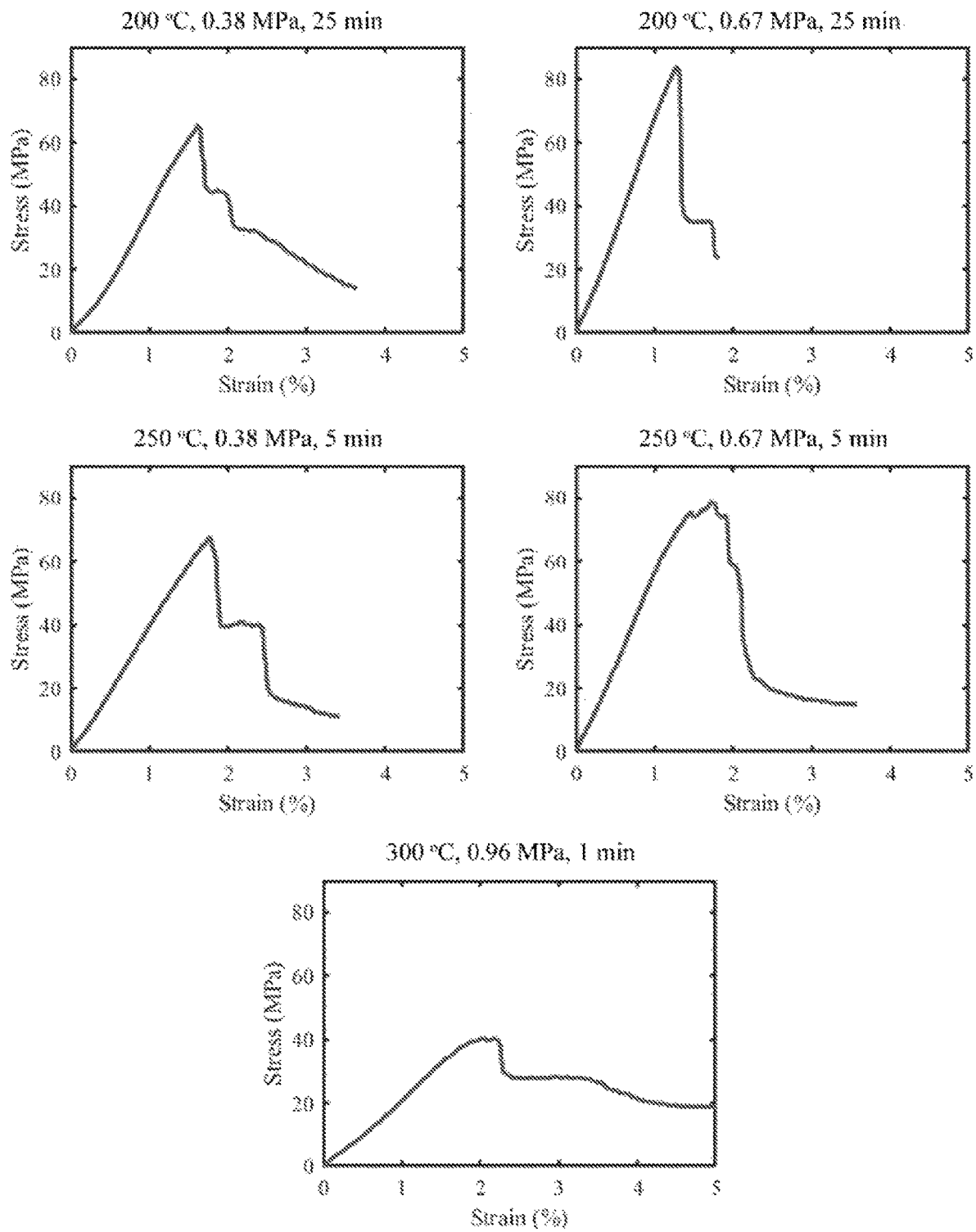
FIG. 7 shows stress-strain curves of fiber reinforced composites produced according to embodiments of the disclosure.

Three different pressures were used in the experiment: 0.38, 0.67 and 0.96 MPa. With short processing time (5 minutes) and low temperature (200° C.), the vitrimer powder was not sufficiently fused under low or moderate pressure (0.38 and 0.67 MPa). Under a higher pressure (0.96 MPa), the vitrimer powder fused into a matrix but was severely cracked, presumably due to the large residual stress generated by the high pressure. A longer processing time was used (i.e., 200° C. and 25 minutes), and a statistically significant improvement in both the Young's modulus and tensile strength was observed when the pressure increased from 0.38 to 0.67 MPa. Raising the pressure to 0.96 MPa caused the vitrimer matrix to crack. The same trend was observed under higher temperature (250° C.) but shorter processing time (5 minutes). Interestingly, with sufficiently high temperature and processing time (250° C. and 25 minutes), increasing the pressure did not significantly change the mechanical properties of the composite samples. Uniaxial tensile stress-strain curves of the vitrimer composite samples produced under different conditions are illustrated in FIG. 7.

The results demonstrated that with sufficient temperature and pressure, vitrimer composite samples produced with short processing times can possess mechanical properties comparable to those with longer processing times. The data also illustrated a general qualitative trend on how temperature, processing time and pressure cooperatively determine mechanical properties of the resulting composites, i.e., higher temperature, higher pressure or longer processing time can lead to higher modulus and strength for the vitrimer composite. However, there were exceptions to this trend. For example, the samples produced at 0.67 MPa and 250° C. under 25 minutes had lower modulus and strength than those produced at the same pressure but lower temperature (200° C./25 minutes) or shorter time (250° C./5 minutes), which is opposite to the general trend. A possible explanation is that the residual stress due to excessive vitrimer creep or fiber/matrix thermal mismatch is more severe at the condition of 250° C. and 25 minutes, which may decrease the modulus and strength of the resultant composite samples.

Example 2

Figure 8:
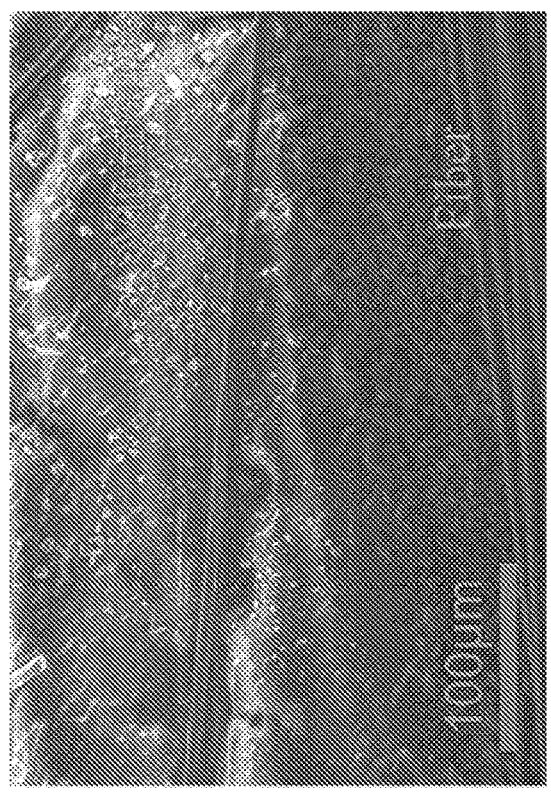
FIG. 8 shows scanning election microscope images of fiber reinforced composites produced according to embodiments of the disclosure.
Figure 8:
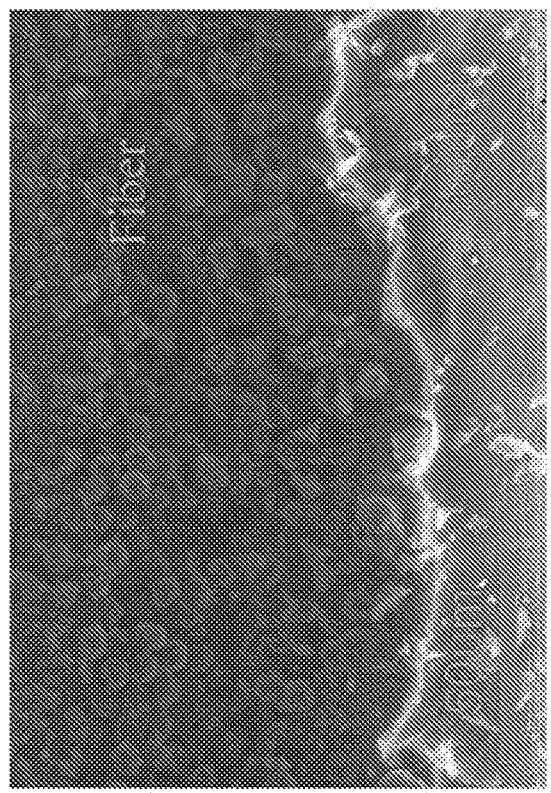

To examine the bonding quality between the carbon fiber and vitrimer matrix, microscopic structures of representative composite samples for each processing condition were imaged using scanning electron microscopy. No visible voids were observed in the fused vitrimer matrix and the carbon fibers remained intact after the compression molding process. Impregnation of the fused vitrimer matrix and the fibers was observed at the fiber-matrix interface, demonstrating that good fiber-matrix interaction was achieved through the compression molding process using vitrimer powder. FIG. 8 provides images from scanning electron microscopy of composite samples prepared using the following processing conditions: (a) 250° C., 0.38 MPa and 25 min; (b) 250° C., 0.96 MPa and 5 min.

Example 3

Thermogravimetric analysis (TGA) was performed on the pure vitrimer to examine thermal degradation behavior at high temperature. The result of the TGA test showed that only a small mass loss (0.8%) occurred at 300° C. and significant mass loss did not occur until the temperature reached ~400° C., suggesting that a temperature≤300° C. should not cause any significant thermal degradation in the vitrimer matrix.

Examples 4-5 below are based on a powder-based rapid fabrication method of fiber reinforced composites using a polyimine-based vitrimer. Polyimine film was synthesized from a mixture of terephthaldehyde, diethylenetriamine and tris(2-aminoethyl)amine in a 1.00:0.30:0.47 molar ratio. terephthaldehyde (4.44 g, 33.1 mmol) and diethylenetriamine (1.02 g, 9.9 mmol) were dissolved in ethanol (80 mL). After the mixture became homogeneous, tris(2-aminoethyl)amine (2.26 g, 15.4 mmol) diluted in 20 mL of ethanol was added, and the solution was transferred to a box-shaped tray (10 cm×10 cm×2 cm) made by folding silicone-coated release paper. The solvent was allowed to evaporate in a fume hood under ambient conditions to form a defect-free polymer film. The resulting uncured film was further cured by hot press at 75° C. for 2 hours, then at 85° C. for 2 hours, and, finally, at 105° C. for 2 hours. The mechanical properties of prepared polyimine polymers were measured from uniaxial tensile tests as ~1.74 GPa (Young's modulus) and ~40.11 MPa (tensile strength).

Figure 9:
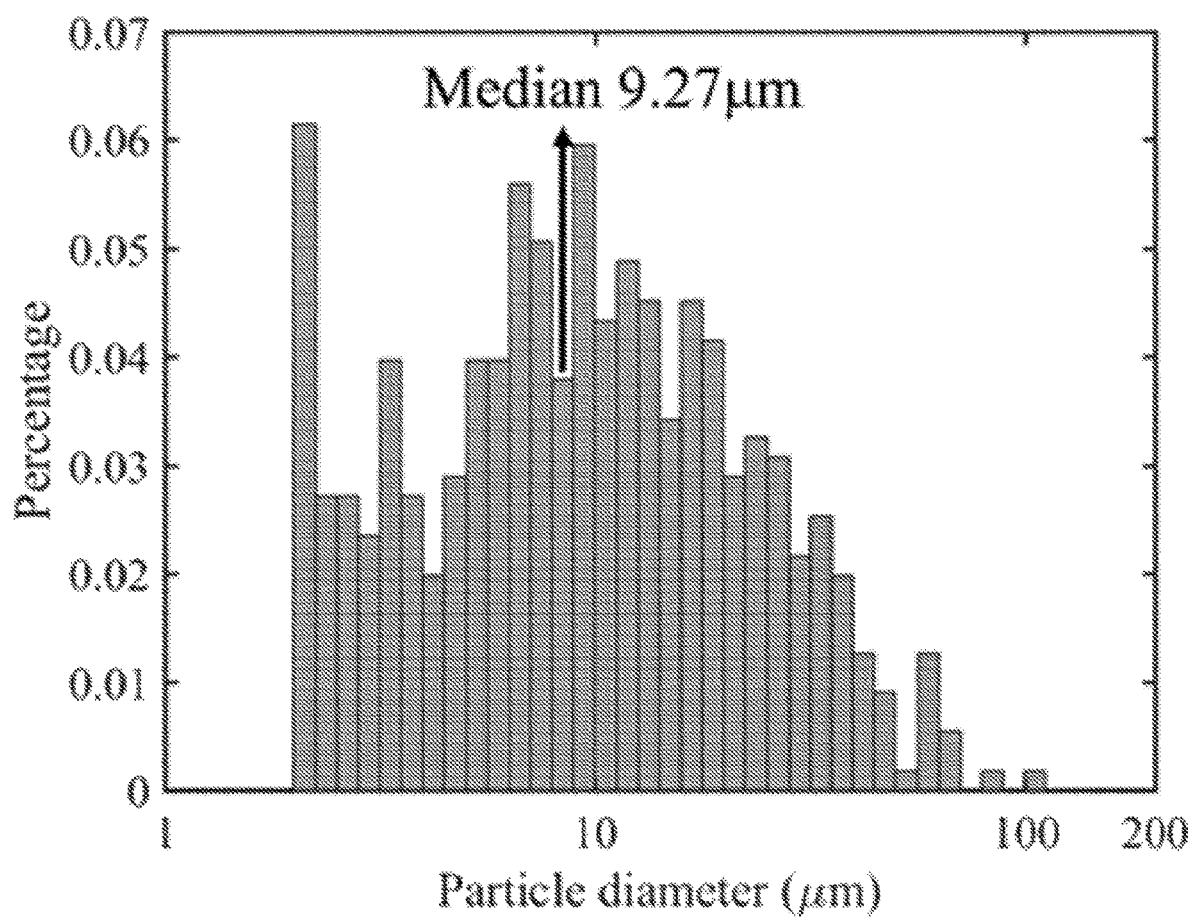
FIG. 9 shows a chart of particle size distribution for a CAN powder according to an embodiment of the disclosure.

Polyimine powder was prepared by grinding the synthesized polyimine polymer using a belt grinder (80 grit level, 1 In.×30 In. Belt Sander). The size distribution of the vitrimer particles within the powder were examined using an optical microscope and analyzed using image processing software. An equivalent diameter of spherical particles having the same areas as the vitrimer particles was distributed between 3 μm and 100 μm, with a median particle size of 9.27 μm, as shown in FIG. 9.

A first layer of polyimine powder was deposited into a mold, where a Teflon cloth was added in advance to separate the powder and the mold surface, facilitating the material peeling from the mold after compression molding. A small amount of water was sprayed on the powder. A trimmed interwoven carbon fiber mat (1 T 300K, ROCK WEST COMPOSITES, West Jordan, UT) fitting with the mold was placed on the deposited powder. A second layer of polyimine powder was deposited on the fiber mat. A small amount of water was also sprayed on the powder. The weight of deposited powder and the carbon fiber mat was prescribed to control the fiber weight ratio of resulting composites, two ratios of 57 wt % and 38 wt % were used. Another Teflon cloth was added and the mold was closed. The entire assembly was placed in in a heat press machine (CARVER LABORATORY PRESS MODEL C, CARVER INC., Wabash, IN) and a compression molding process was performed under prescribed pressure and temperature, in which the polyimine particles were fused into a continuous matrix embedded with the carbon fiber mat.

Example 4

Composite samples were fabricated with different combinations of the three parameters: temperature of 90° C. and 110° C., pressure of 0.58, 0.96, and 1.25 MPa; and processing time of 1-60 min. Uniaxial tensile tests were performed to evaluate the mechanical properties of both the composite samples made with different processing conditions (Table 2). Tensile specimens were cut from these samples and had the dimensions of around of 100 mm (long)×8 mm (wide). The thickness of the specimens was ~0.33 mm and may vary from sample to sample. The tensile tests were performed on a mechanical testing machine (INSTRON 5695, INSTRON, Norwood, MA) with a gauge length (length between two grips) of ~65 mm. A tensile rate of 5 mm/min was used in all tests to ensure a quasi-static tensile process.

TABLE 1

Mechanical Properties of Epoxy-Acid Vitrimer Composites

| Processing conditions (110° C.) | Modulus (GPa) | Strength (MPa) |
|---|---|---|
| 1.25 MPa, 60 min | 13.04 ± 01.82 | 112.59 ± 28.31 |
| 0.96 MPa, 30 min | 5.07 ± 1.72 | 43.83 ± 13.16 |
| 0.96 MPa, 4 min | 6.02 ± 0.52 | 40.90 ± 11.00 |
| 0.96 MPa, 2 min | 4.67 ± 1.04 | 37.75 ± 5.92 |
| 0.58 MPa, 2 min | 4.38 ± 0.69 | 32.69 13.48 |

Example 5

Recycling of the polyimine fiber reinforced composites was performed to demonstrate the simultaneous recycling of the polyimine matrix and carbon fibers. The composite sample (1.894 g, fiber 57 wt. %) was dissolved in diethylenetriamine (0.741 g, 7.17 mmol) and ethanol (100 mL) for 24 hours to retrieve the carbon fiber mat and a solution of polyimine monomers. The fibers were dried under vacuum at 100° C. for 3 hours and weighed to be 1.060 g (~98.2% weight of the original fiber). The approximate volume of the recycled solution was measured to be 200 mL. The concentrations of terephthaldehyde, tris(2-aminoethyl)amine and diethylenetriamine in the recycled solution were determined to be 19.2 mM, 41.6 mM, and 8.96 mM, respectively. A portion of the recycled solution (30 mL, approximate content: diethylenetriamine ~0.129 g, 1.25 mmol; terephthaldehyde ~0.077 g, 0.58 mmol; tris(2-aminoethyl)amine ~0.039 g, 0.27 mmol) was added to a suspension of terephthaldehyde (0.482 g, 3.59 mmol) in ethanol (~15 mL) while stirring. Tris(2-aminoethyl)amine (0.245 g, 1.68 mmol) was added when the mixture became homogeneous. The mixed solution was transferred to a tray prepared from silicone-coated release paper. The resulting uncured composite film was further cured by hot press at 75° C. for 2 hours, then at 85° C. for 2 hours, and, finally, at 105° C. for 2 hours. The recycled polymer was ground into a powder, which, together with the recycled carbon fiber, was deposited into an aluminum mold following the steps described fabricating the original polyimine vitrimer composite. The assembly was subjected to a heat pressing process under 110° C., 1.25 MPa and 60 min, forming a recycled composite sample having similar mechanical properties as the original polyimine vitrimer composites.

Example 6

Three-ply curved composites made from the powder-based one-ply polyimine composites and exhibiting a curved surface were selected as repair test samples. Defects were created in the matrix by scratching the surface and wetted powder was deposited on the defects. A heated iron (~75° C.) was pressed on the defect area in-situ for ~5 minutes. To avoid flattening of the three-ply composite sample (which has thermal malleability), very little force (<10 N) was applied by hand. Surprisingly, following application of the heated iron, the defected area was repaired and exhibited a translucent state with the powder fully fused. Some insufficiently fused powder remained at the edges of the applied powder due to the total applied force being so low, and particularly due to the pressure at the edge being much lower than that of the center of contact between the curved composite and the flat iron surface.

To improve the repair quality, a supported mold was provided under a defective sample to prevent flattening and a similar repair experiment was performed with a larger force (still applied by hand) but still at ~75° C. for 5 minutes. After processing, the powder was fully fused and no discriminable boundary was observed between the original and the newly fused matrix. For a composite product composed of more plies, which is more resistant to bending, the mold is expected to be unnecessary for achieving good repair quality. Using a roller or spherical tool to heat press and repair the defects on uneven surfaces is expected to give better repair quality as the repair quality was observed to be highly dependent on the local pressure.

The present disclosure can be embodied in other specific forms without departing from its spirit or essential characteristics. Thus, the described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of forming a fiber reinforced composite, the method comprising:
   providing a covalent adaptable network polymer (CAN) powder and a fiber material; and
   compressing the CAN powder and the fiber material at an elevated temperature and an elevated pressure to form a composite material,
   wherein the elevated pressure of the compressing step is within a range of 0.5 MPa to 1.25 MPa.

2. The method of claim 1, wherein the step of providing the CAN powder further comprises:
   performing chemical synthesis to obtain a cured CAN material; and
   grinding the cured CAN material to form the CAN powder.

3. The method of claim 1, wherein the CAN powder and the fiber material are combined in a mold prior to the compressing step.

4. The method of claim 1, wherein the elevated temperature of the compressing step is less than 400° C.

5. The method of claim 4, wherein the elevated temperature of the compressing step is less than 300° C.

6. The method of claim 4, wherein the elevated temperature of the compressing step is within a range of 100° C. to 300° C.

7. The method of claim 1, wherein the elevated pressure of the compressing step is in a range of 0.65 to 1.00 MPa.

8. The method of claim 1, wherein the elevated pressure and temperature of the compressing step are applied for a period of less than 60 minutes.

9. The method of claim 1, wherein the elevated pressure and temperature of the compressing step are applied for a period of less than 10 minutes.

10. The method of claim 1, the method further comprising:
    shaping the composite material; and
    heating the shaped composite material at a thermoforming temperature.

11. The method of claim 1, wherein the CAN powder comprises a vitrimer powder.

12. The method of claim 11, wherein the vitrimer powder comprises a polyimine powder.

13. The method of claim 1, wherein the fiber material comprises a carbon fiber mat.

14. The method of claim 1, wherein the fiber material comprises a composite in need of repair, the composite in need of repair including reinforcing fibers and a CAN matrix.

15. A method of forming a fiber reinforced composite, the method comprising:
   providing a covalent adaptable network polymer (CAN) powder and a fiber material; and
   compressing the CAN powder and the fiber material at an elevated temperature and an elevated pressure to form a composite material,
   wherein the CAN powder is wetted prior to the compressing step.

16. The method of claim 15, wherein the CAN powder is wetted with water prior to the compressing step.

17. The method of claim 15, wherein the CAN powder is wetted with pure amine compounds prior to the compressing step.

\* \* \* \* \*